(12) United States Patent
Gohr et al.

(10) Patent No.: US 9,056,649 B2
(45) Date of Patent: Jun. 16, 2015

(54) ATV BRAKE ACTUATOR WITH HIDDEN PAWL

(75) Inventors: Jeffrey S. Gohr, Menomonee Falls, WI (US); Lee A. Pfeil, Elkhart Lake, WI (US)

(73) Assignee: HB PERFORMANCE SYSTEMS, INC., Mequon, WI (US)

( * ) Notice: Subject to any disclaimer, the term of this patent is extended or adjusted under 35 U.S.C. 154(b) by 427 days.

(21) Appl. No.: 13/234,958

(22) Filed: Sep. 16, 2011

(65) Prior Publication Data

US 2013/0069355 A1 Mar. 21, 2013

(51) Int. Cl.
| | |
|---|---|
| B62K 23/06 | (2006.01) |
| B60T 7/10 | (2006.01) |
| B60T 11/16 | (2006.01) |
| B60T 11/22 | (2006.01) |

(52) U.S. Cl.
CPC ............ *B62K 23/06* (2013.01); *B60T 7/104* (2013.01); *B60T 11/16* (2013.01); *B60T 11/22* (2013.01)

(58) Field of Classification Search
CPC ......... B60T 11/16; B60T 11/22; B60T 7/104; B62K 23/06
USPC ................ 188/265, 24.18, 344, 353; 60/533; 92/20, 23
See application file for complete search history.

(56) References Cited

U.S. PATENT DOCUMENTS

| | | | | |
|---|---|---|---|---|
| 735,113 | A | * | 8/1903 | Kelland ................ 188/24.18 |
| 3,800,618 | A | * | 4/1974 | Yoshigai ................ 74/489 |
| 3,845,847 | A | * | 11/1974 | Camp ................ 477/204 |
| 3,948,361 | A | * | 4/1976 | Carlson ................ 188/24.18 |
| 4,726,252 | A | * | 2/1988 | Dawson ................ 74/523 |
| 4,862,999 | A | * | 9/1989 | Rakover ................ 188/24.18 |
| 5,875,688 | A | | 3/1999 | Porter et al. |
| 5,887,486 | A | * | 3/1999 | Lin et al. ................ 74/489 |
| 6,835,904 | B2 | | 12/2004 | McGuire et al. |
| 7,992,690 | B2 | * | 8/2011 | Cross ................ 188/24.18 |
| 2006/0071542 | A1 | * | 4/2006 | Lichtensteiger et al. ....... 303/89 |
| 2008/0011563 | A1 | * | 1/2008 | Yamamoto ................ 188/265 |
| 2008/0047785 | A1 | * | 2/2008 | Huang ................ 188/24.18 |
| 2010/0252380 | A1 | * | 10/2010 | Nguyen ................ 188/265 |
| 2011/0192687 | A1 | * | 8/2011 | Miles ................ 188/344 |

\* cited by examiner

*Primary Examiner* — Robert A Siconolfi
*Assistant Examiner* — Charles Poon
(74) *Attorney, Agent, or Firm* — Michael Best & Friedrich LLP

(57) ABSTRACT

A hydraulic brake actuator adapted to be mounted on a vehicle handlebar and hydraulically coupled to a brake mechanism. The brake actuator includes a brake base adapted to be secured to the handlebar, and a reservoir adapted to be coupled to the brake base and containing brake fluid, the reservoir having a bottom surface. The hydraulic brake actuator further includes a piston-cylinder assembly coupled to the reservoir, a brake lever movable relative to the brake base between a released position and an actuated position, and a locking pawl positioned to limit movement between the brake lever and the piston-cylinder assembly, the locking pawl being at least partially positioned directly below the bottom surface of the reservoir.

18 Claims, 13 Drawing Sheets

ATV BRAKE ACTUATOR WITH HIDDEN PAWL

BACKGROUND

The present invention relates generally to ATV brake actuators, and more specifically to ATV brake actuators having locking pawls for holding the brake actuator in the engaged position.

ATV brake actuators are commonly mounted on the handlebars of an ATV so that the user may operate the ATV's brakes by using his hand to pull a lever. Many ATVs include a parking brake pawl on the brake actuator to allow the user to secure the brakes in an engaged position by pulling the lever and engaging the parking brake pawl.

ATVs are often operated in off-road environments where they may come into contact with objects such as trees, rocks, etc. Some ATVs include racks on the front of the ATV for carrying firewood, camping gear, etc. These racks are near the brake actuator and objects may come into contact with the brake actuator while the objects are being loaded. If the brake actuator comes into contact with an object, then some parts of the brake actuator, such as the parking brake pawl, may be damaged.

SUMMARY OF THE INVENTION

The present invention provides a handlebar-steered motor vehicle including a main frame, a seat supported by the main frame, a steering assembly pivotally coupled to the main frame and including a handlebar, a brake mechanism for slowing a speed of the vehicle, and a hydraulic brake actuator mounted on the handlebar and hydraulically coupled to the brake mechanism. The brake actuator includes a brake base secured to the handlebar, a reservoir coupled to the handlebar and containing brake fluid, the reservoir having a bottom surface, and a piston-cylinder assembly coupled to the reservoir. The brake actuator also includes a brake lever movable relative to the brake base between a released position and an actuated position, and a locking pawl positioned to limit movement between the brake lever and the piston-cylinder assembly, the locking pawl being at least partially positioned directly below the bottom surface of the reservoir.

In one embodiment, the locking pawl includes an extension arm that is coupled with the locking pawl to pivot relative to the brake lever between a locked position and an unlocked position. Preferably, the extension arm pivot at least 30 degrees (and preferably at least 40 degrees, and most preferably about 50 degrees) when moving from the unlocked position to the locked position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
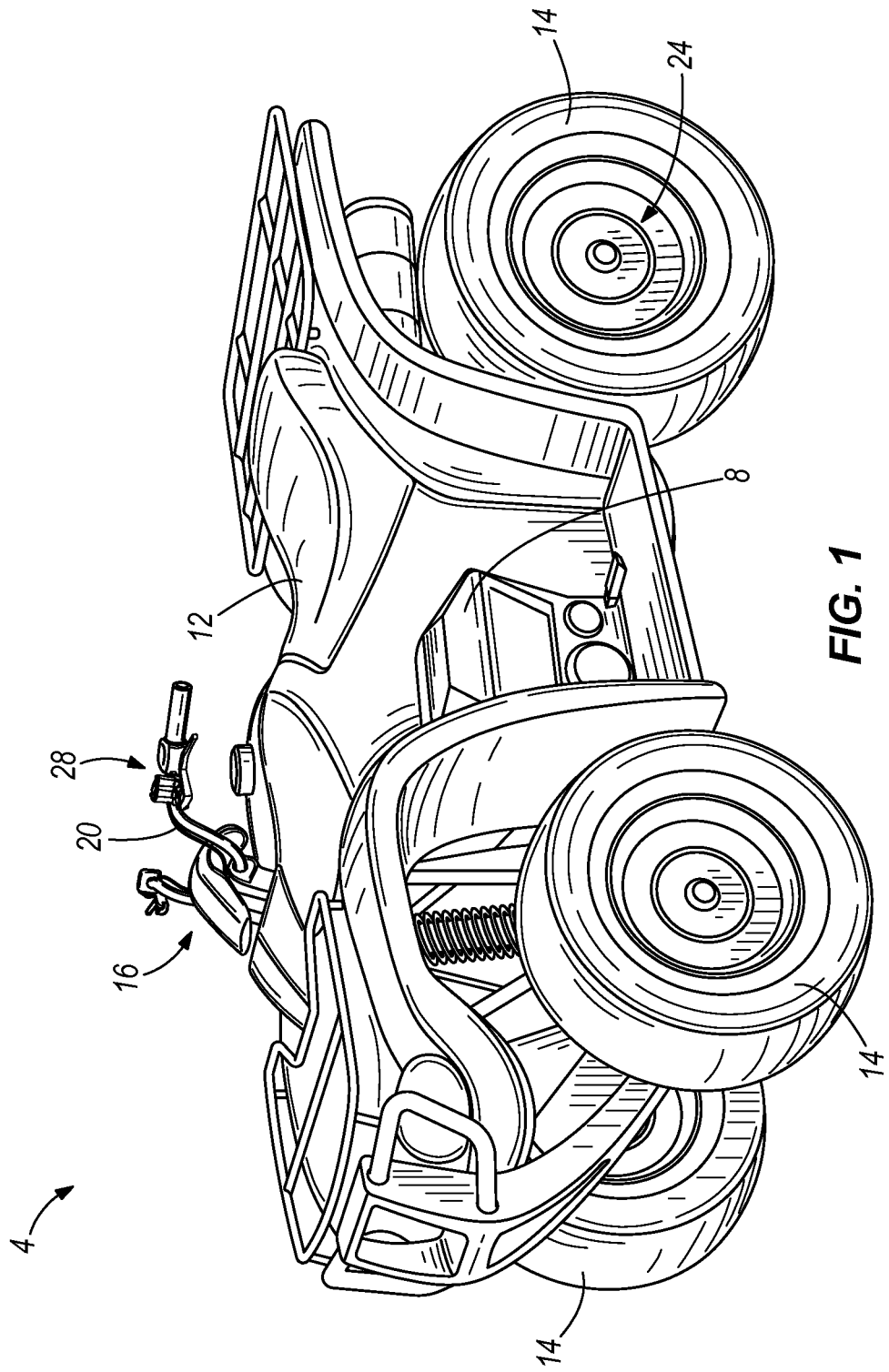
FIG. 1 is a perspective view of an ATV embodying the present invention.

FIG. 1 is a perspective view of a motor vehicle 4 in the form of an all terrain vehicle (ATV) having a main frame 8, a seat 12 supported by the main frame 8, a plurality of wheels 14, a steering assembly 16 pivotally coupled to the main frame 8 and including a handlebar 20, a brake mechanism 24 for slowing a speed of the vehicle 4, and a hydraulic brake actuator 28 mounted on the handlebar 20 and hydraulically coupled to the brake mechanism 24. It should be noted that while the hydraulic brake actuator 28 is shown and described in association with an ATV, other vehicles (e.g. snowmobiles) could also employ the hydraulic brake actuator 28.

Figure 2:
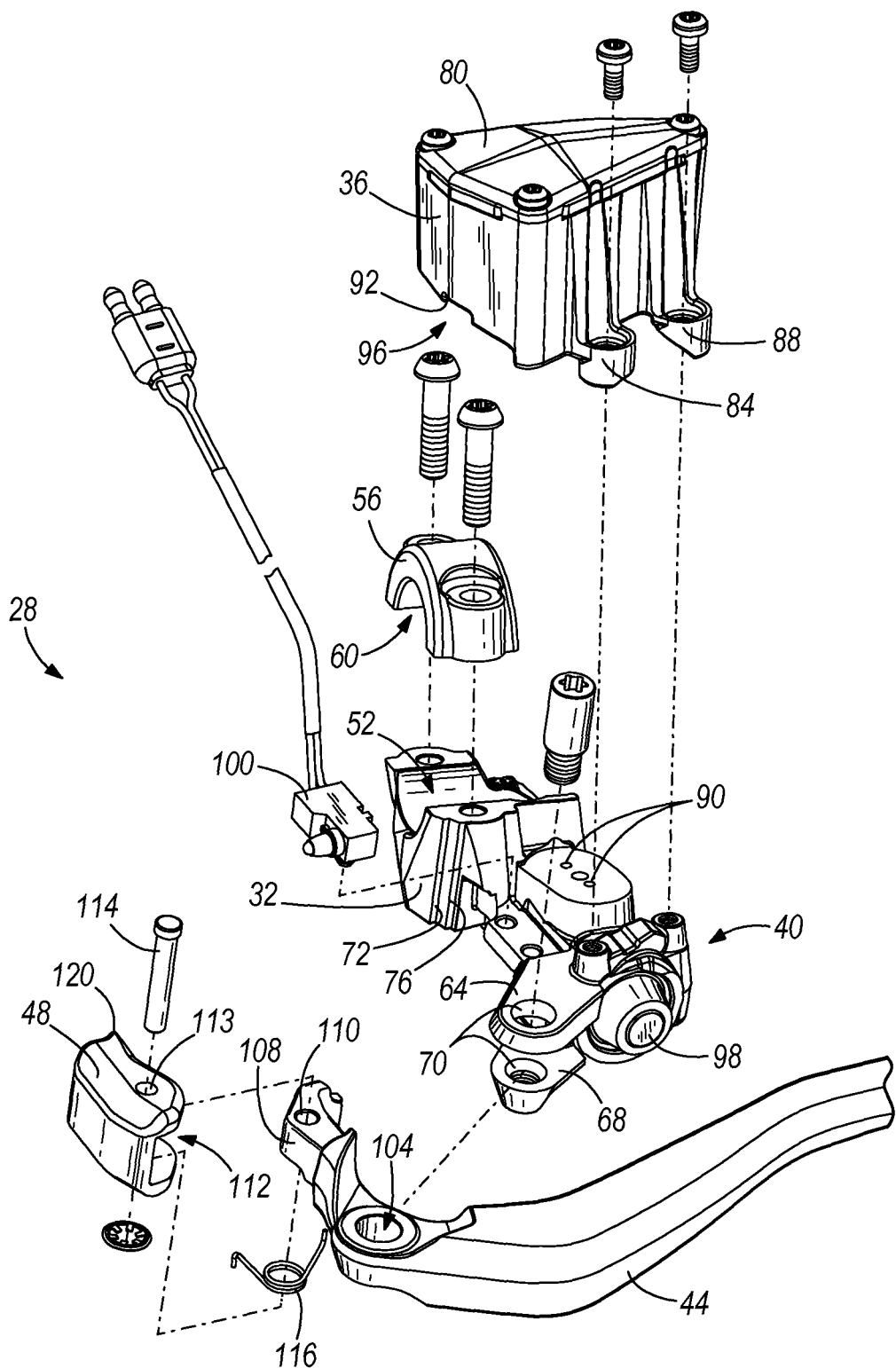
FIG. 2 is an exploded perspective view of a hydraulic brake actuator of the ATV illustrated in FIG. 1.
Figure 3:
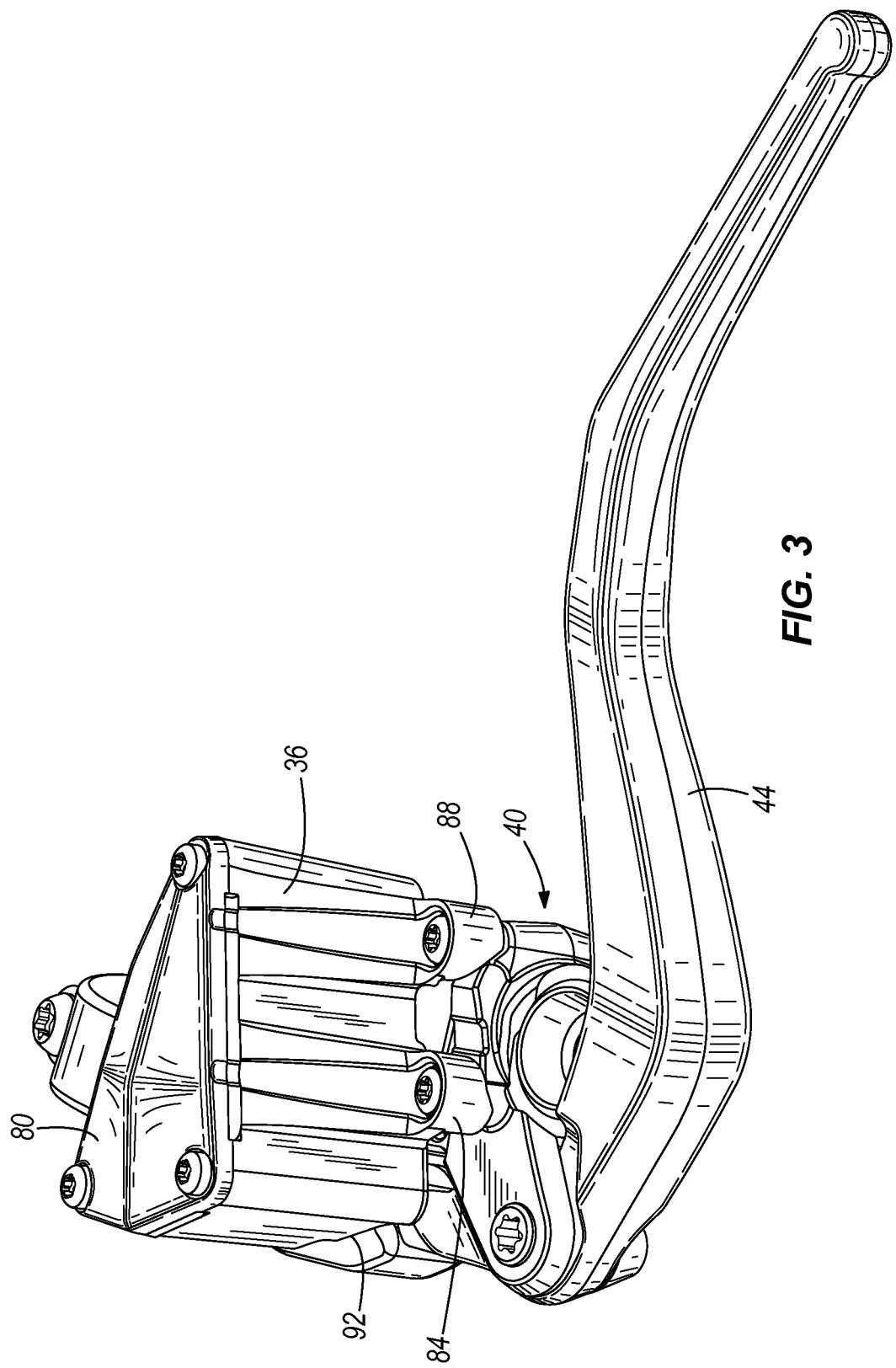
FIG. 3 is an assembled perspective view of the hydraulic brake actuator in FIG. 2.

Referring to FIGS. 2 and 3, the hydraulic brake actuator 28 includes a brake base 32, a reservoir 36, a piston-cylinder assembly 40 coupled to the reservoir 36 and the brake base 32, a brake lever 44 coupled to the brake base 32, and a locking pawl 48 coupled to the brake lever 44.

The brake base 32, best seen in FIG. 2, includes a first semi-cylindrical recess 52 configured to receive a portion of the handlebars 20. A clamping member 56 having a second semi-cylindrical recess 60 is configured to receive a portion of the handlebars 20. The clamping member 56 and the brake base 32 may be coupled together using screws or the like to secure the brake base 32 to the handlebars 56. The brake base 32 also includes first and second protrusions 64, 68, each having an opening 70 disposed thereon. The first and second protrusions 64, 68 are configured so that a portion of the brake lever 44 is received in a space between the first and second protrusions 64, 68 and a screw or the like is inserted into the openings to couple the brake lever 44 to the brake base 32. The brake base also includes first and second detents 72, 76 that provide engagement points for the locking pawl 48, as described below.

Figure 7:
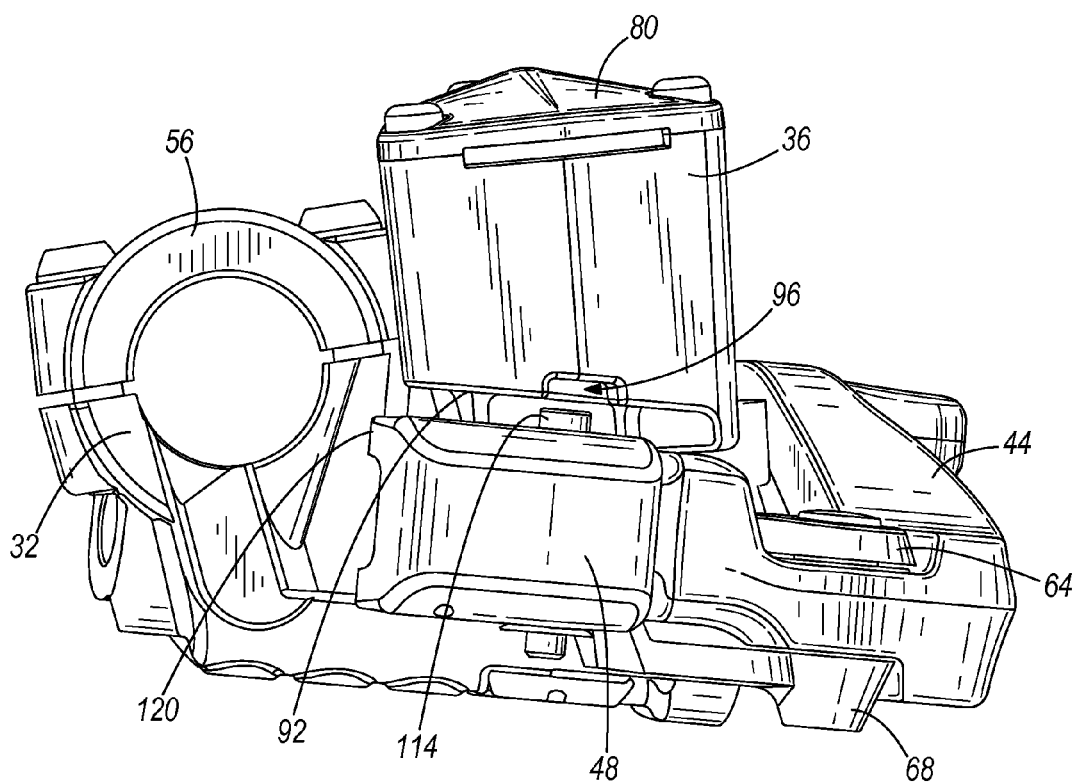
FIG. 7 is a side view of the hydraulic brake actuator in FIG. 2.

The reservoir 36 contains hydraulic fluid in an interior portion of the reservoir 36. The reservoir 36 includes a lid 80 secured using a plurality of screws and a gasket to seal the interior portion of the reservoir 36. The reservoir 36 also includes first and second attachment portions 84, 88 for coupling the reservoir 36 to the piston-cylinder assembly 40. Screws or the like pass through recesses on the first and second attachment portions 84, 88 and are received in corresponding recesses on the piston-cylinder assembly 40. The hydraulic fluid can flow between the reservoir 36 and the piston-cylinder assembly through ports 90, as is known in the art. A bottom surface 92 of the reservoir includes a recessed portion 96 (best seen in FIGS. 2 and 7).

The piston-cylinder assembly 40 is coupled to the brake base 32 and is fluidly coupled to the brake mechanism 24 and the reservoir 36. The piston-cylinder assembly 40 includes a piston 98 that can be pushed into a cylinder by the brake lever 44. When the piston 98 is pushed into the cylinder, hydraulic fluid is pressurized, and serves to actuate the brake mechanism 24 and thus slow the vehicle 4. A piston-biasing member (not shown) is disposed next to the piston 98 and serves to return the piston 98 to an extended state when the brake lever 44 is not actuated. In one embodiment, a sensor 100 is coupled to the piston-cylinder assembly 40 and sends a signal to activate a brake light when the piston 98 is pushed into the cylinder.

The brake lever 44 includes a hole 104 for coupling the brake lever 44 to the brake base 32. The hole 104 on the brake lever 44 may be aligned with the holes 70 on the first and second protrusions 64, 68 so that a screw or the like can pass through the recesses and couple the brake lever 44 to the brake base 32. The brake lever 44 is thereby able to rotate with respect to the brake base 32. The brake lever 44 further includes a support arm 108 with a hole 110.

The locking pawl 48 includes a recess 112 allowing a portion of the locking pawl 48 to receive and cover a portion of the support arm 108. Two holes 113 in the locking pawl are aligned with the recess of the support arm 108, allowing a pivot pin 114 to rotationally couple the locking pawl 48 to the support arm 108. A spring 116 is disposed on the pivot pin 114 to bias the locking pawl 48 towards an unlocked position. The locking pawl 48 includes a finger 120 that is sized and configured to interface with the first and second detents 72, 76 on the brake base 32.

Figure 5:
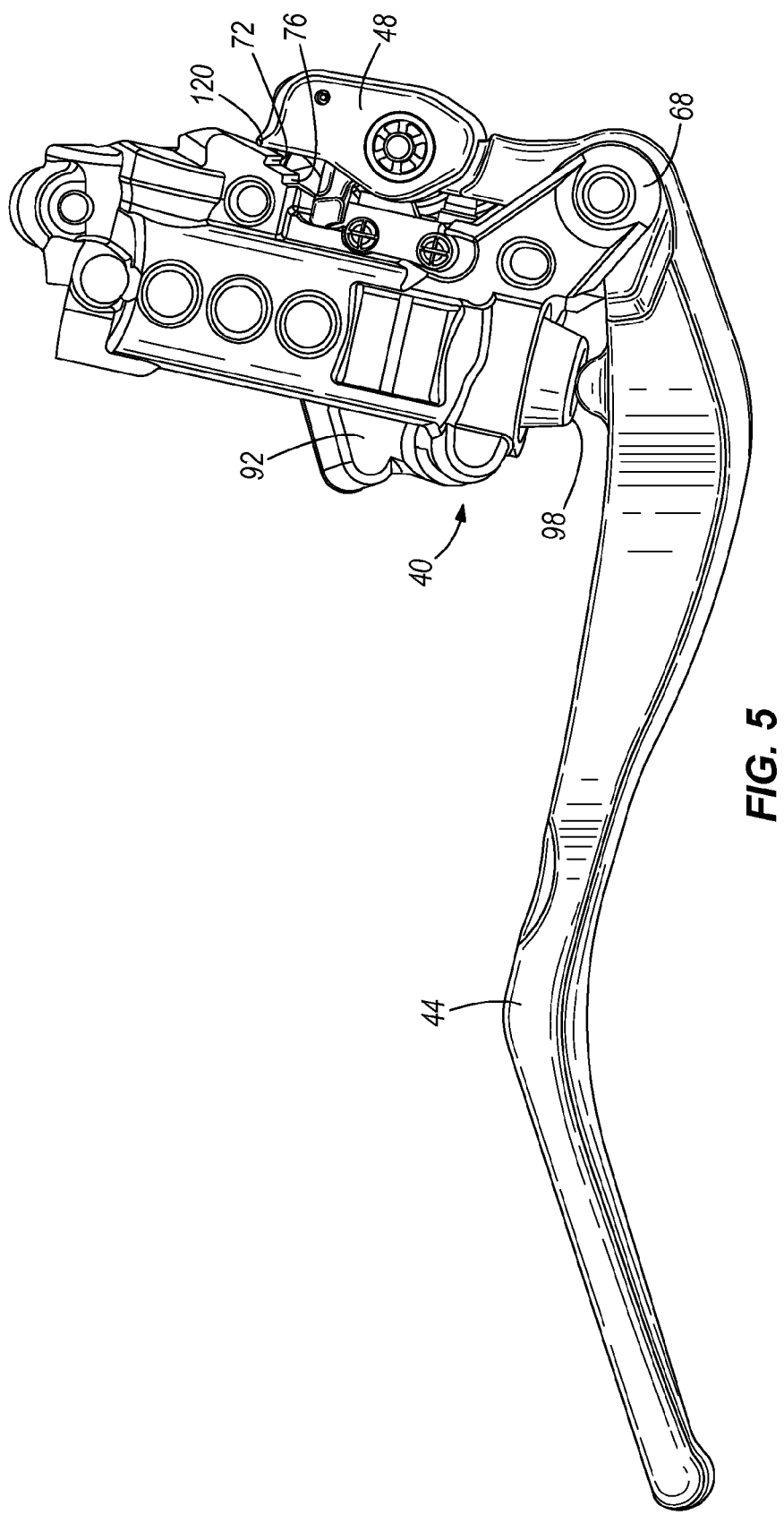
FIG. 5 is a bottom view of the hydraulic brake actuator in FIG. 2, showing the hydraulic brake actuator in a released position.

The hydraulic brake actuator 28 may be operated to activate or release the brake mechanism 24. In a released position (see FIG. 5), the piston-biasing member pushes the piston 98 to an extended state, thus pushing the brake lever 44 away from the piston-cylinder assembly 40. In the released position, the hydraulic brake actuator 28 is not activated and the locking pawl 48 is in an unlocked position. In the unlocked position, the spring 116 rotationally biases the finger 120 of the locking pawl 48 away from the first and second detents 72, 76.

Figure 6:
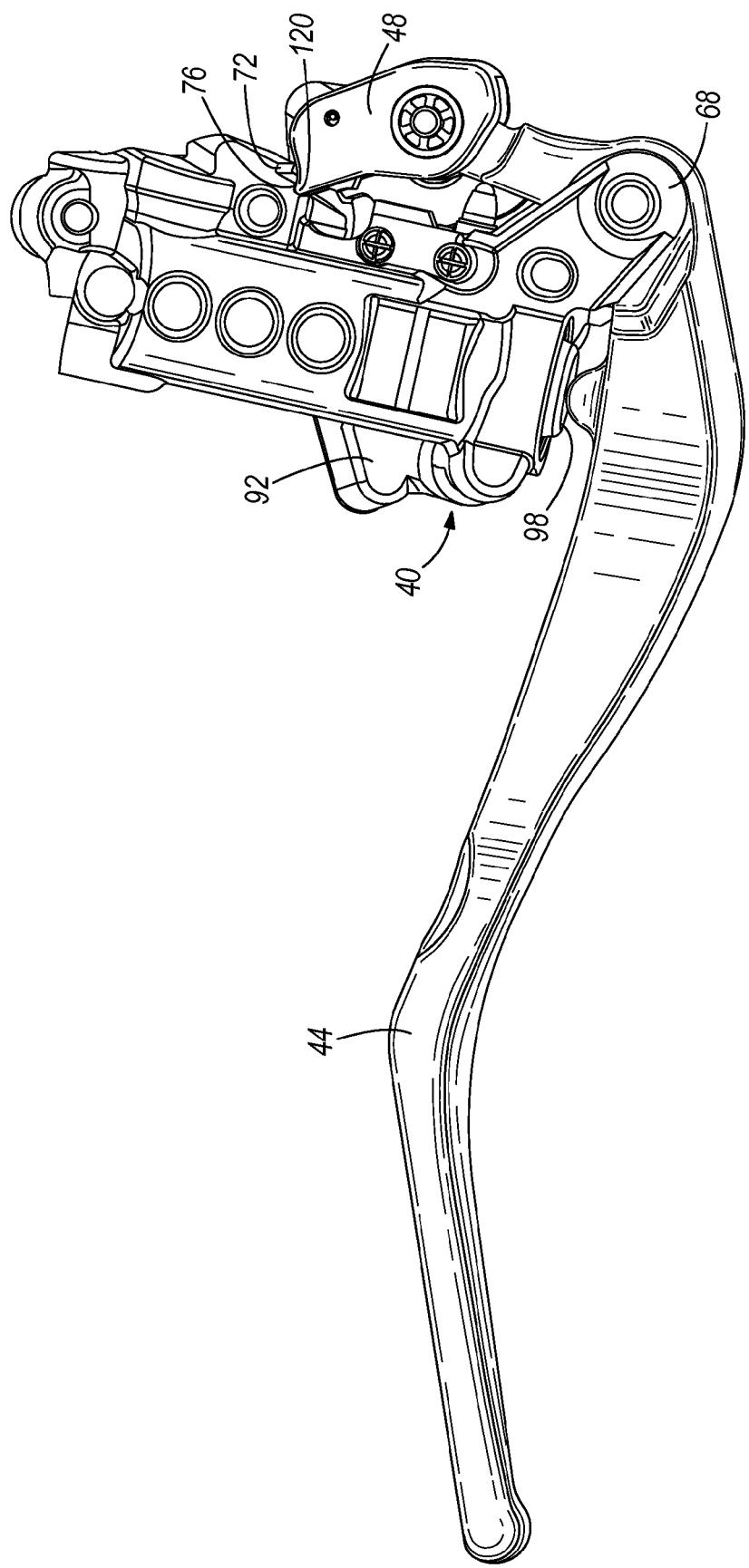
FIG. 6 is a bottom view of the hydraulic brake actuator in FIG. 2, showing the hydraulic brake actuator in an engaged/locked position.

In an engaged position (see FIG. 6), the user pulls the brake lever 44 towards the piston-cylinder assembly 40, thus pushing the piston 98 into the cylinder and activating the brake mechanism 24. If the user desires to release the hydraulic brake actuator 28 from the engaged position, the user simply releases engagement of the brake lever 44 and allows the brake lever 44 to return to the released position under force of the piston-biasing member.

In a locked position, the locking pawl 48 locks the brake lever 44 in the engaged position. In order to hold the hydraulic brake actuator 28 in the engaged/locked position, the user first puts the hydraulic brake actuator 28 in the engaged position, as explained above. The user then rotates the finger 120 of the locking pawl 48 against the bias of the spring 116 and towards the first or second detent 72, 76, so that the finger 120 is proximate to the first or second detent 72, 76. The user must hold the locking pawl 48 in this position while releasing the brake lever 44, which allows the piston-biasing member to push the piston 98 toward the extended state, thus pushing the brake lever 44 away from the piston-cylinder assembly 40 also allowing the finger 120 to contact the first or second detent 72, 76. When the finger 120 contacts the first or second detent 72, 76, the locking pawl 48 stops the brake lever 44 from returning to the released position, and thus holds the hydraulic brake actuator 28 in the engaged/locked position. When the finger 120 contacts the first or second detent 72, 76, the user no longer needs to hold the locking pawl 48 in the locked position because the contact between the finger 120 and the first or second detent 72, 76 holds the locking pawl 48 in the locked position. Thus the locking pawl 48 locks the brake lever 44 in the engaged/locked position.

When the user desires to release the hydraulic brake actuator 28 from the engaged/locked position, the user pulls on the brake lever 44 thus disengaging the contact between the finger 120 and the first or second detent 72, 76. The spring 116 is then able to rotate the locking pawl 48 to the unlocked position. At this point the brake mechanism is in the engaged position. The user may then release the brake mechanism from the engaged position as explained above.

Figure 4:
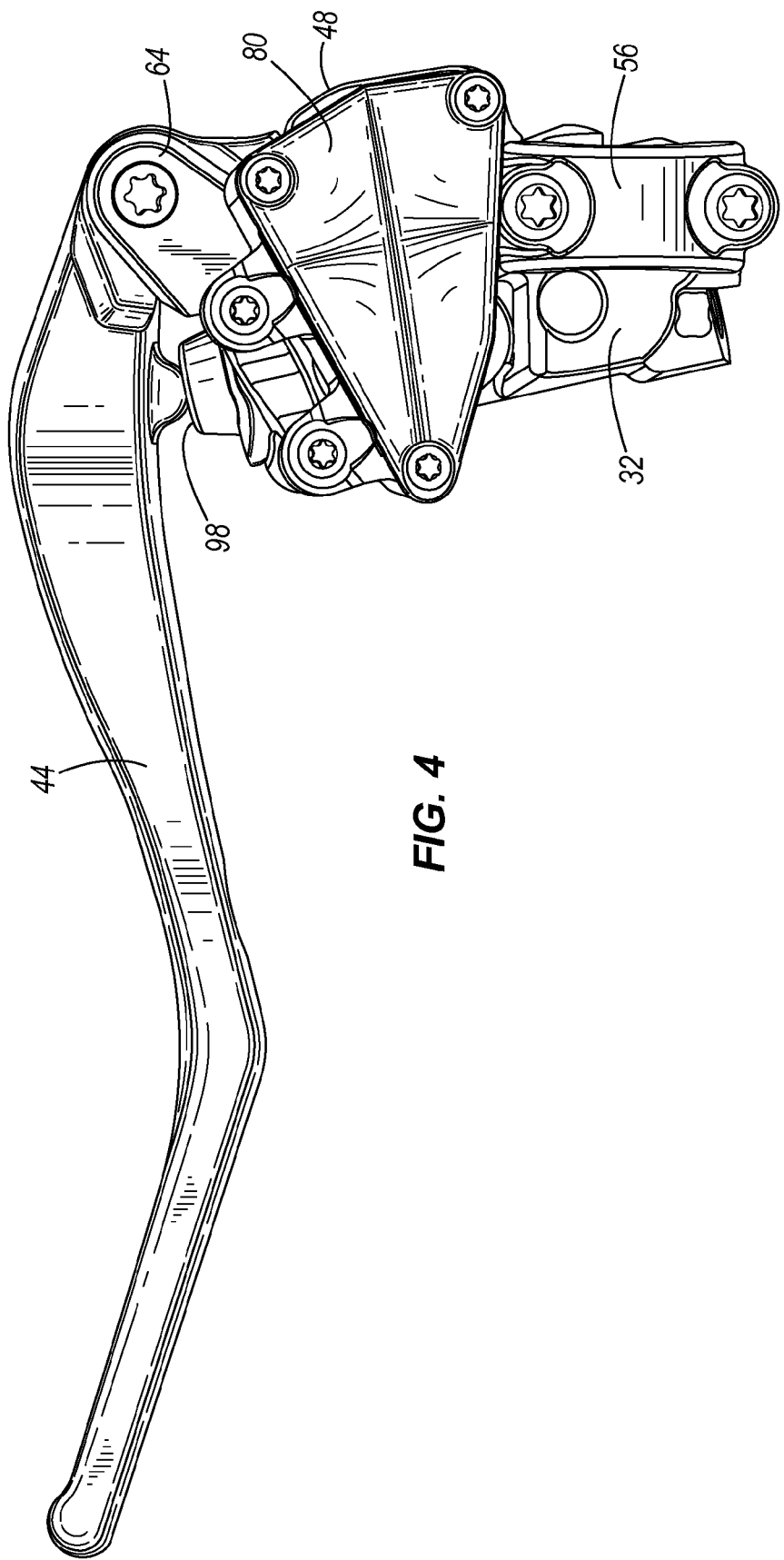
FIG. 4 is a top view of the hydraulic brake actuator in FIG. 2.

As best seen in FIG. 4, the hydraulic brake actuator 28 is configured so that the locking pawl 48 is at least partially positioned directly below the bottom surface 92 of the reservoir 36. The recessed portion 96 of the reservoir 36 provides clearance for at least a portion of the pivot pin 114 (see FIG. 7). A portion of the piston-cylinder assembly 40 and the brake base 32 is also disposed below the bottom surface 92 of the reservoir 36. Thus the reservoir 36 serves to protect portions of the locking pawl 48, pivot pin 114, piston-cylinder assembly 40 and brake base 32 from damage that may occur when the vehicle 4 comes into contact with an object (e.g. trees).

FIGS. 8-13 are perspective views of an alternative embodiment of the hydraulic brake actuator 28 illustrated in FIGS. 2-7, and the same components are assigned the same numerals of reference but will not be described again in detail to avoid repetition. In describing the alternative embodiment illustrated in FIGS. 8-13, only the differences between the embodiment illustrated in FIGS. 2-7 and the alternative embodiment will be described.

Figure 8:
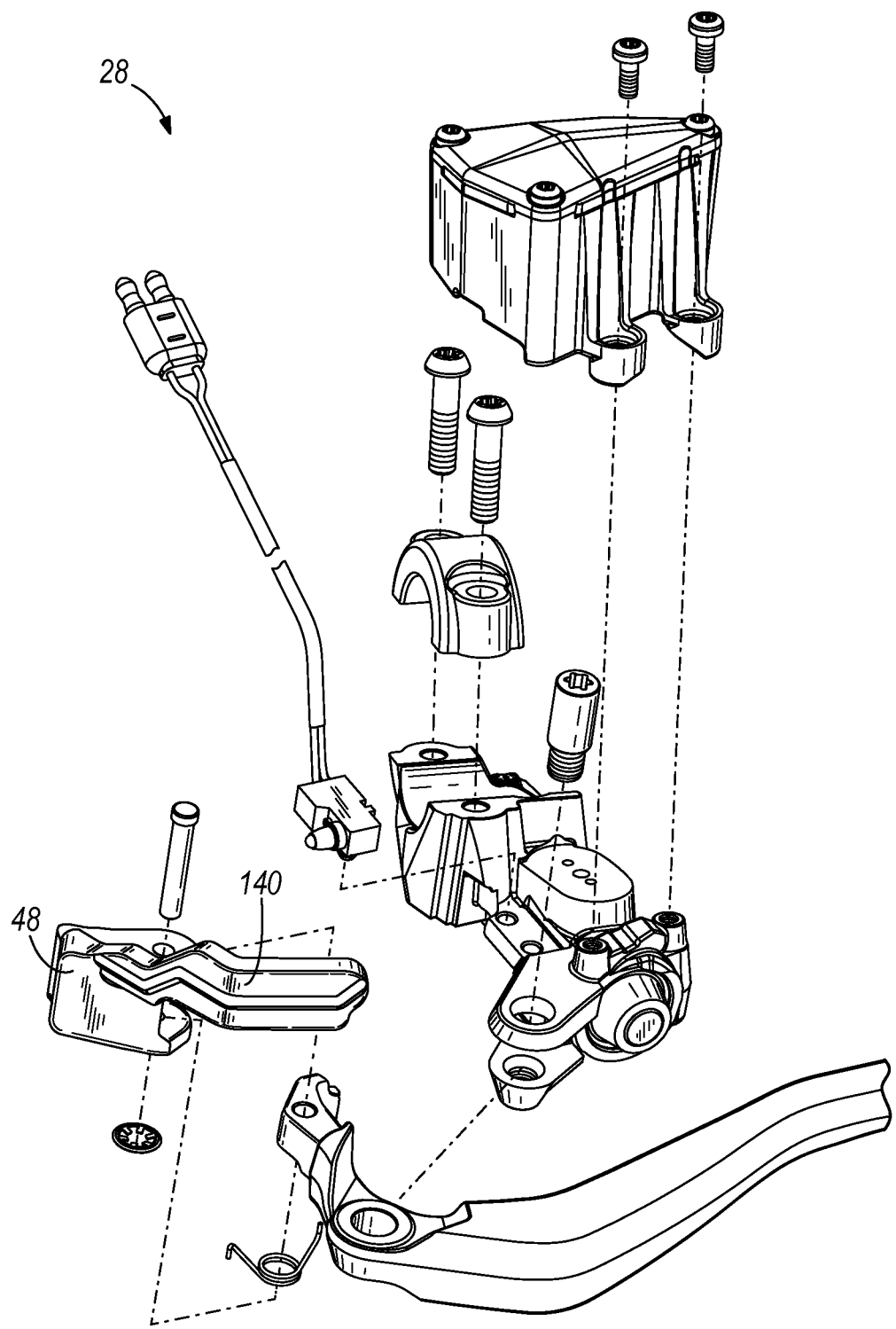
FIG. 8 is an exploded perspective view of an alternative embodiment of the hydraulic brake actuator of the ATV illustrated in FIG. 1.
Figure 9:
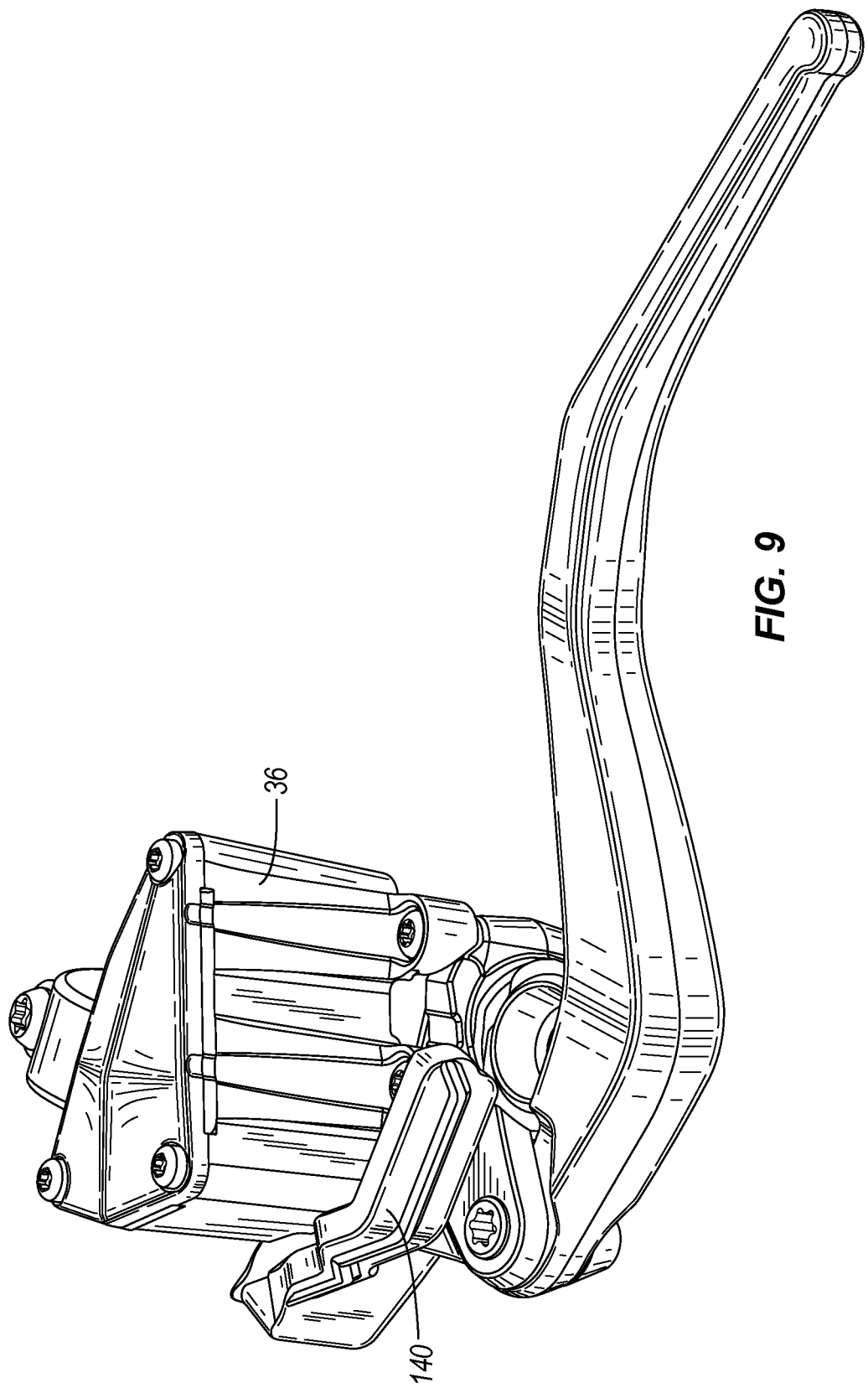
FIG. 9 is an assembled perspective view of the hydraulic brake actuator in FIG. 8.
Figure 10:
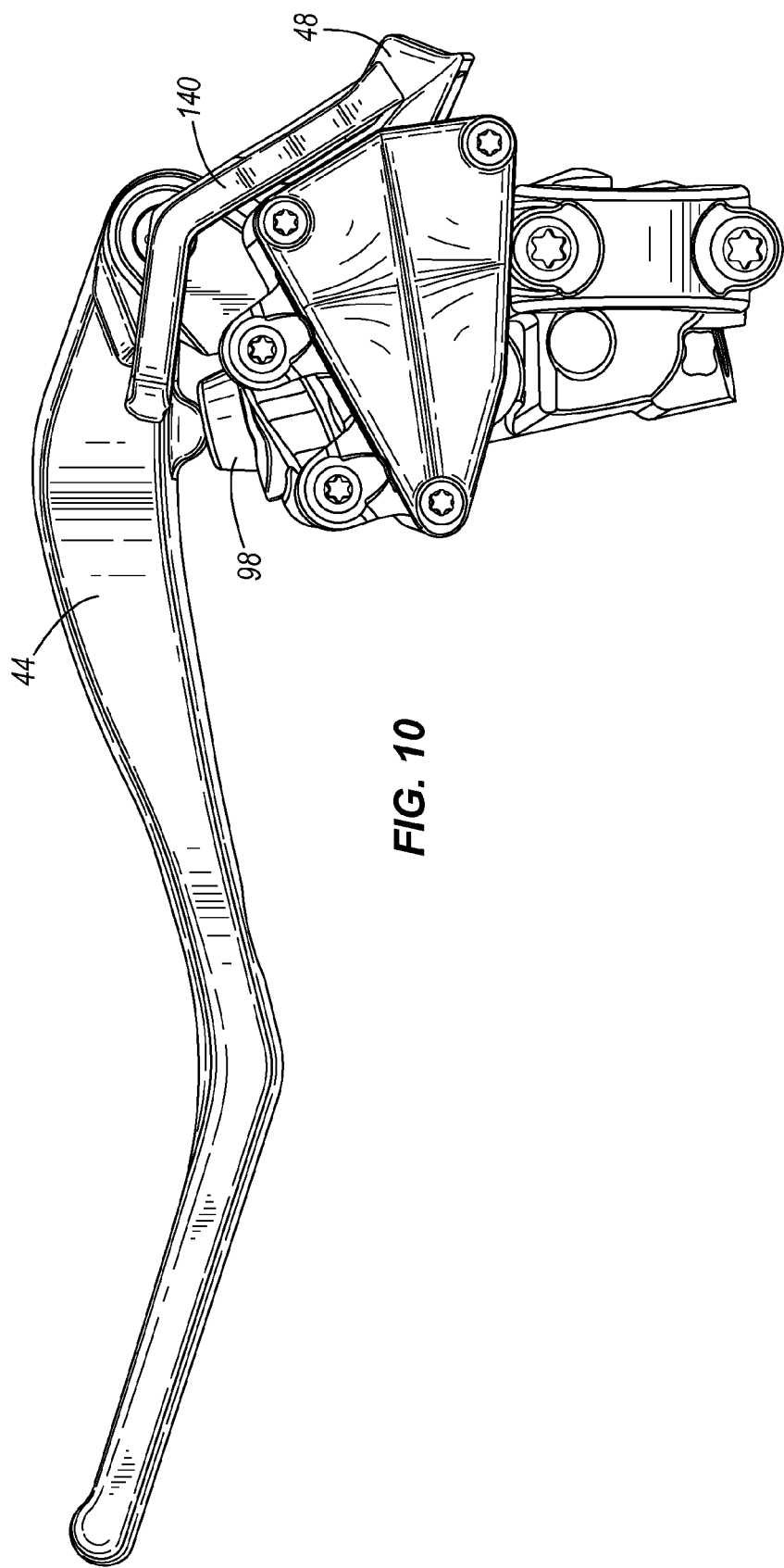
FIG. 10 is a top view of the hydraulic brake actuator in FIG. 8.
Figure 11:
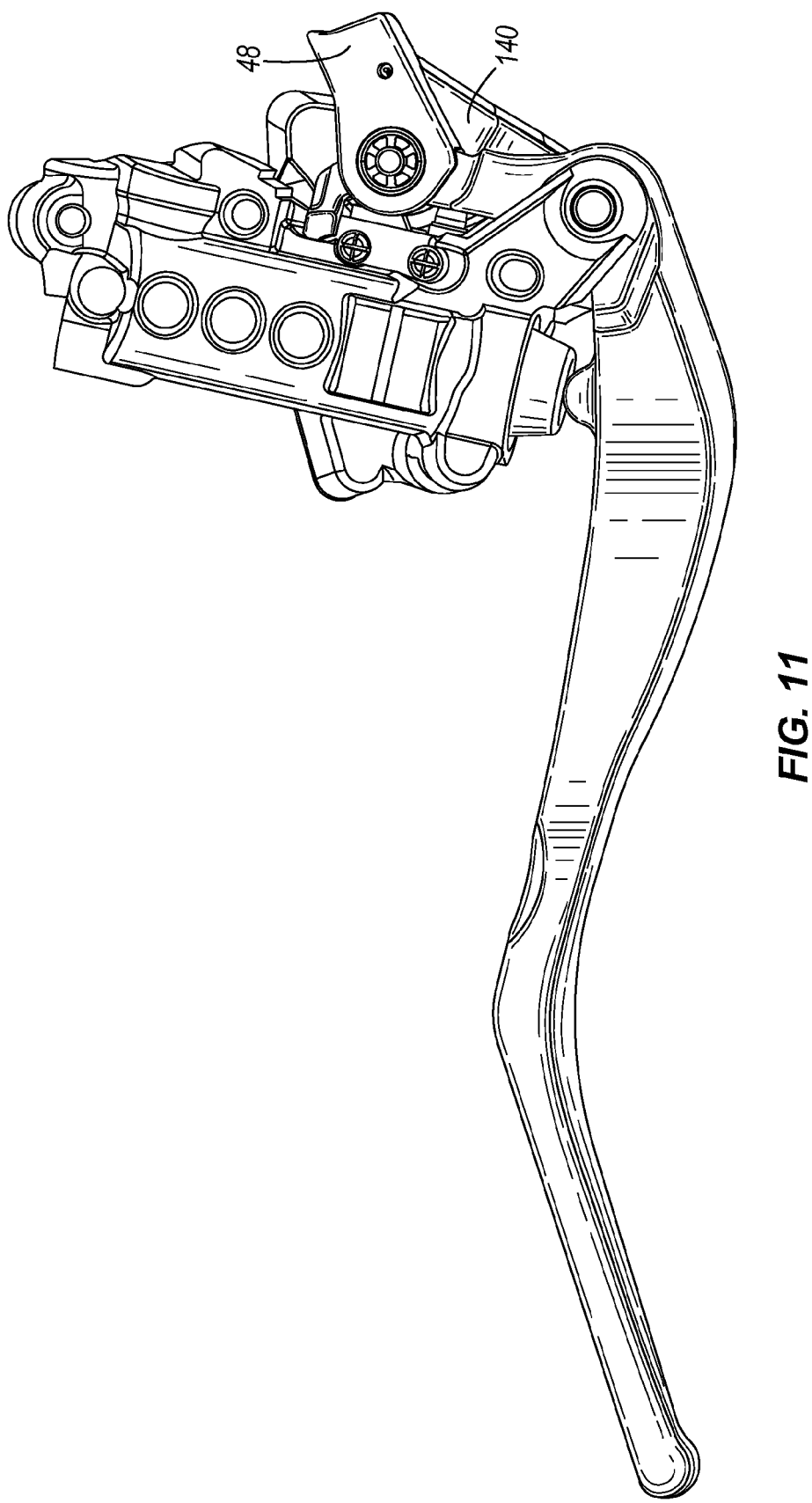
FIG. 11 is a bottom view of the hydraulic brake actuator in FIG. 8, showing the hydraulic brake actuator in a released position.

FIG. 8 illustrates an alternative embodiment of the hydraulic brake actuator 28 including an extension bar 140 extending from the locking pawl 48. The extension bar 140 and locking pawl 48 are manufactured as a single component, while in other embodiments the extension bar 140 and locking pawl 48 are separate components that are coupled together. As best seen in FIG. 10, when in the unlocked position, the extension bar 140 extends from the locking pawl 48 along the side of the reservoir 36 and bends around the front of the reservoir 36 towards and roughly parallel to the main lever 44. An end of the extension bar 140 is disposed in the vicinity of the piston 98. For visibility, the extension bar is colored red so that the user can easily see when the parking brake is activated or locked.

Figure 12:
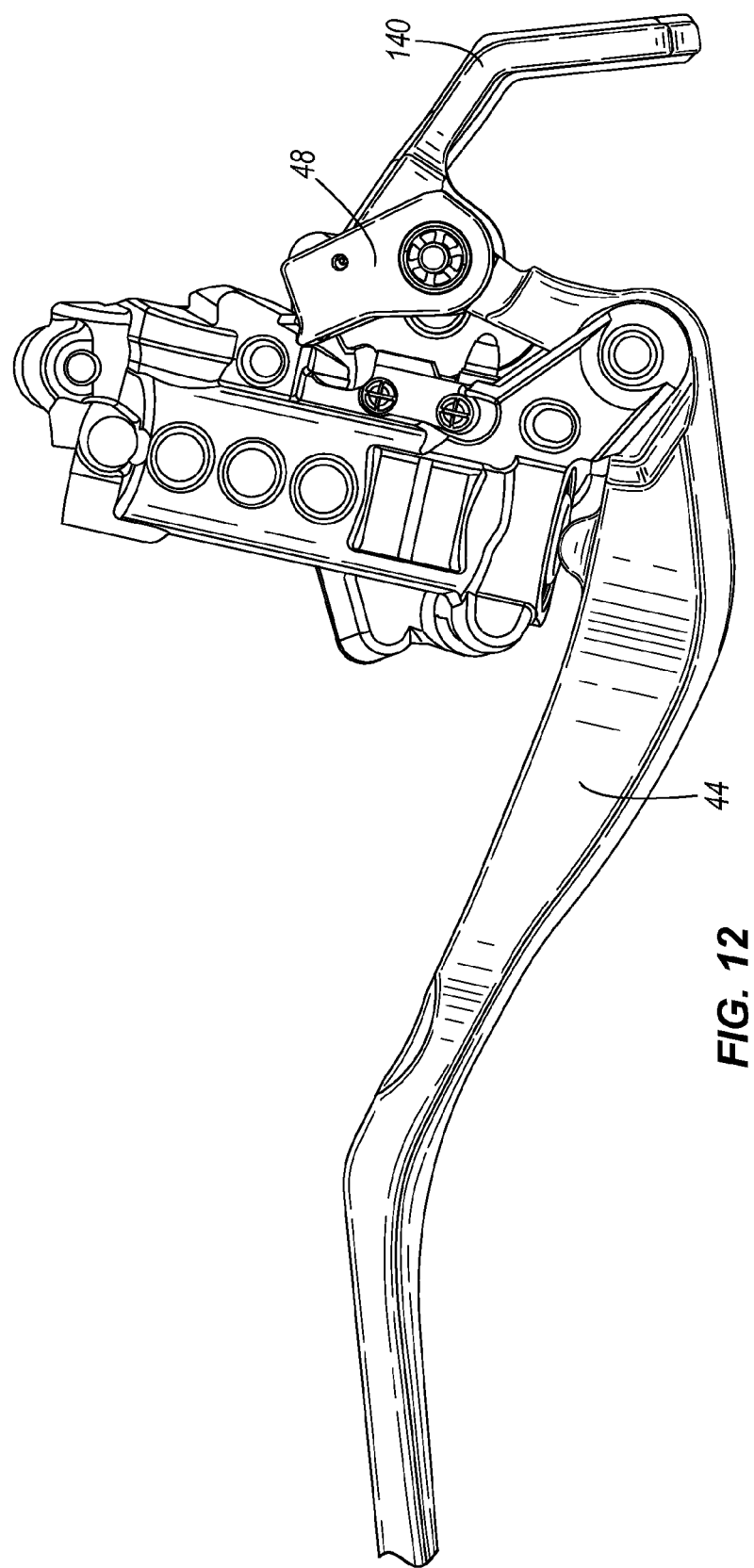
FIG. 12 is a bottom view of the hydraulic brake actuator in FIG. 8, showing the hydraulic brake actuator in an engaged/locked position.
Figure 13:
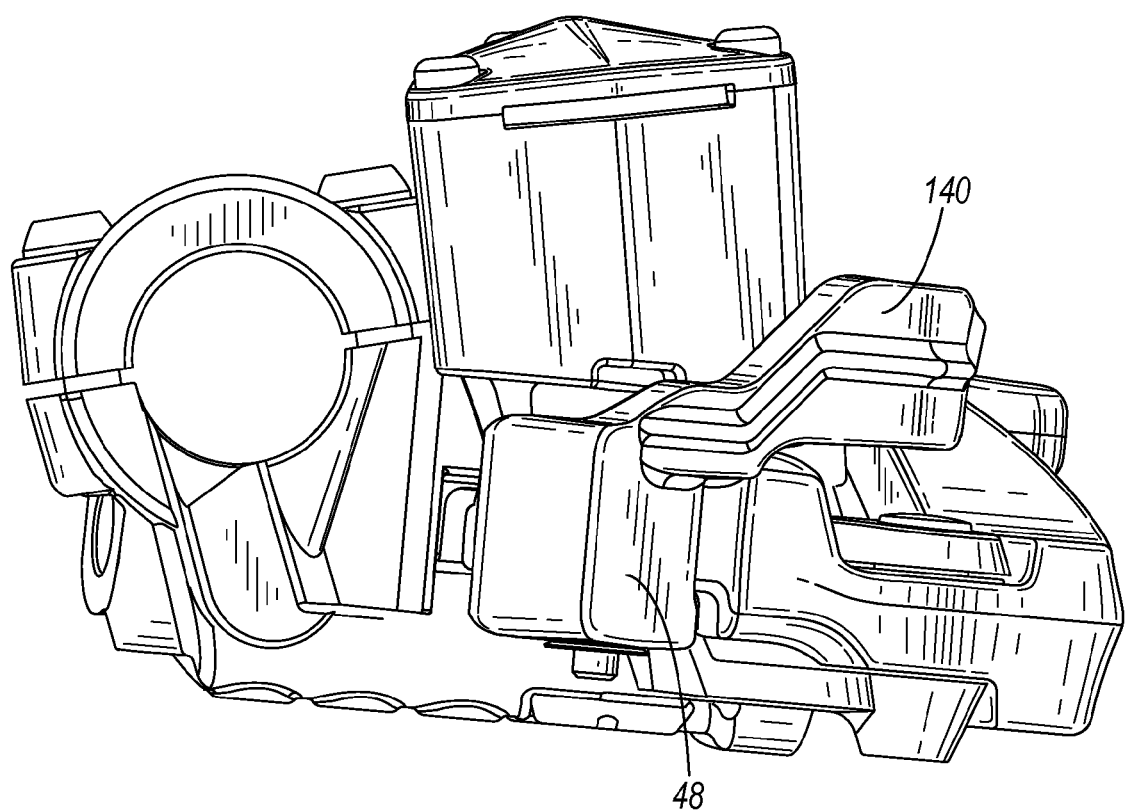
FIG. 13 is a side view of the hydraulic brake actuator in FIG. 8.

As best seen in FIG. 12, in order to position the locking pawl 48 in the locked position, the extension bar 140 must be moved in a direction away from the brake lever 44. This requires rotation of the locking pawl 48 and extension bar 140 by an angle of about 50 degrees. Such rotation of the locking pawl 48 from the unlocked position to the locked position move the extension arm 140 from a position directly above the main lever 44 (FIG. 10) to a position forward of the main lever 44 (FIG. 12).

The extension bar 140 serves to protect the reservoir 36 (best seen in FIG. 9) from branches, rocks, and other debris that the user may encounter while operating the ATV or snowmobile. The extension bar 140 also inhibits the locking pawl 48 from being unintentionally moved to the locked position by an aftermarket accessory, such as a hand guard or handlebar gauntlet, etc. When the extension bar 140 is pushed toward the brake lever 44, the risk of the locking pawl 48 being inadvertently pushed into the locked position is greatly reduced.

Various features and advantages of the invention are set forth in the following claims.

The invention claimed is:

1. A handlebar-steered motor vehicle comprising:
   a main frame;
   a seat supported by the main frame;
   a steering assembly pivotally coupled to the main frame and including a handlebar;
   a brake mechanism for slowing a speed of the vehicle;
   a hydraulic brake actuator mounted on the handlebar and hydraulically coupled to the brake mechanism, the brake actuator comprising:
      a brake base secured to the handlebar;
      a reservoir coupled to the brake base and containing brake fluid, the reservoir having a bottom surface and a lid opposite the bottom surface;
      a piston-cylinder assembly coupled to the reservoir;
      a brake lever movable relative to the brake base between a released position and an actuated position; and
      a locking pawl positioned to limit movement between the brake lever and the piston-cylinder assembly, the locking pawl being at least partially positioned directly below the bottom surface of the reservoir,
   wherein the bottom surface of the reservoir includes a recessed portion that receives at least a portion of the locking pawl, and
   wherein the recessed portion receives at least a portion of the locking pawl when the brake lever is in the released position.

2. The motor vehicle of claim 1, wherein the motor vehicle comprises at least three wheels rotationally coupled to the main frame.

3. The motor vehicle of claim 1, wherein the locking pawl is pivotally coupled to the brake lever and includes a pivot pin, and wherein at least a portion of the pivot pin is positioned with the recessed portion.

4. The motor vehicle of claim 1, further comprising a support arm secured to and movable with the brake lever, the support arm supporting the locking pawl.

5. The motor vehicle of claim 4, wherein the locking pawl is pivotally coupled to the support arm.

6. The motor vehicle of claim 4, wherein the support arm is positioned directly below the bottom surface of the reservoir.

7. A hydraulic brake actuator adapted to be mounted on a vehicle handlebar and hydraulically coupled to a brake mechanism, the brake actuator comprising:
   a brake base adapted to be secured to the handlebar;
   a reservoir adapted to be coupled to the brake base and containing brake fluid, the reservoir having a bottom surface and a lid opposite the bottom surface;
   a piston-cylinder assembly coupled to the reservoir;
   a brake lever movable relative to the brake base between a released position and an actuated position; and
   a locking pawl positioned to limit movement between the brake lever and the piston-cylinder assembly, the locking pawl being at least partially positioned directly below the bottom surface of the reservoir,
   wherein the bottom surface of the reservoir includes a recessed portion that receives at least a portion of the locking pawl, and
   wherein the recessed portion receives at least a portion of the locking pawl when the brake lever is in the released position.

8. The hydraulic brake actuator of claim 7, wherein the locking pawl is pivotally coupled to the brake lever and includes a pivot pin, and wherein at least a portion of the pivot pin is positioned with the recessed portion.

9. The hydraulic brake actuator of claim 7, further comprising a support arm secured to and movable with the brake lever, the support arm supporting the locking pawl.

10. The hydraulic brake actuator of claim 9, wherein the locking pawl is pivotally coupled to the support arm.

11. The hydraulic brake actuator of claim 9, wherein the support arm is positioned directly below the bottom surface of the reservoir.

12. The hydraulic brake actuator of claim 7, wherein the locking pawl includes an extension arm.

13. The hydraulic brake actuator of claim 12, wherein the locking pawl and extension arm are coupled together to pivot relative to the brake lever between a locked position and an unlocked position.

14. The hydraulic brake actuator of claim 13, wherein the extension arm rotates relative to the brake lever at least 40 degree when moved from the unlocked position to the locked position.

15. The hydraulic brake actuator of claim 12, wherein at least a portion of the extension arm extends along a side of the reservoir.

16. The hydraulic brake actuator of claim 12 wherein at least a portion of the extension arm extends parallel to at least a portion of the brake lever.

17. The hydraulic brake actuator of claim 12, wherein at least a portion of the extension arm extends along a side of the reservoir and bends around a front side of the reservoir to protect the reservoir.

18. The hydraulic brake actuator of claim 12, wherein the locking pawl is movable between a locked position and an unlocked position by the extension arm and the locking pawl limits movement between the brake lever and the piston-cylinder assembly when the locking pawl is in the locked position, and wherein the extension arm is moved in a direction away from the brake lever to move the locking pawl to the locked position.

* * * * *